United States Patent [19]
Belokin et al.

[11] Patent Number: 5,964,437
[45] Date of Patent: Oct. 12, 1999

[54] MOUNTING SUPPORT

[76] Inventors: Paul Belokin; Martin P. Belokin, both of 7801 I-35 North, Denton, Tex. 76202; Norman P. Belokin, 3341 Evers Pkwy., Denton, Tex. 76207

[21] Appl. No.: 08/958,286

[22] Filed: Oct. 27, 1997

[51] Int. Cl.⁶ .................................................. F16B 47/00
[52] U.S. Cl. ...................... 248/205.5; 248/205.6; 248/363
[58] Field of Search ............... 248/205.5, 205.6, 248/362, 363, 683

[56]  References Cited

U.S. PATENT DOCUMENTS

| | | | |
|---|---|---|---|
| 1,331,427 | 2/1920 | Frank | 248/362 X |
| 1,518,943 | 12/1924 | Story | 248/205.5 |
| 2,123,549 | 7/1938 | Williams | 248/363 |
| 2,275,299 | 3/1942 | Hummert | 248/205.5 X |
| 2,451,194 | 10/1948 | Braun | 248/205.6 X |
| 2,557,434 | 6/1951 | Hoverder | 248/205.6 X |
| 5,039,045 | 8/1991 | Adams et al. | 248/363 X |
| 5,087,005 | 2/1992 | Holoff et al. | 248/362 X |
| 5,176,346 | 1/1993 | Liu | 248/362 X |
| 5,390,837 | 2/1995 | Ruffolo, Jr. | 248/205.6 X |

*Primary Examiner*—Derek J. Berger
*Attorney, Agent, or Firm*—Jack A. Kanz

[57]  ABSTRACT

A body of soft, pliable material is used to form a mounting support for securing objects to a substantially flat surface. The body has substantially parallel inner and outer major faces. The inner face is formed to have a slight concavity but is sufficiently soft and pliable to conform to and thus secure itself to roughened surfaces.

19 Claims, 3 Drawing Sheets

MOUNTING SUPPORT

This invention relates to supports for mounting display shelves, racks and the like on substantially flat surfaces without damaging or permanently disfiguring the mounting surface. More particularly, it relates to pliable adhesive support platforms which rely on atmospheric pressure and surface friction for removeably securing the support to a substantially flat surface.

Suction cups are commonly used to mount and secure objects to flat smooth surfaces such as the surfaces of glass, plastic, Formica®, glazed tile, metal, etc. The typical suction cup includes a cup body and a stem. The cup body is generally arcuate or circular and defines a concavity. Typically the stem is integrally formed on the body and used as the place of attachment for the object to be supported by the suction cup. The body of the suction cup is usually made of rubber, plastic or other material having sufficiently resilient properties so that when the body is pressed against a smooth surface the periphery of the cup is enlarged and the volume of concavity is reduced. Air or other fluid in the cup is expelled so that the body forms a tight seal against the smooth surface. Atmospheric pressure outside the body retains the suction cup body against the surface. When the seal between the cup and the surface on which it is mounted is broken, fluids such as air or the like rush into the concavity, releasing the suction attachment to the surface and the resilient material of the suction cup body returns to its relaxed condition.

Since suction cups employ a cup-like body which must be compressed to expel fluid from the concavity, the natural resilience of the body causes the body to attempt to return to its natural (formed) cup-like shape. If the peripheral edges of the cup remain sealed with the mounting surface, the cup remains securely attached. However, if any leakage occurs between the cup and the mounting surface, the cup is automatically disengaged from the mounting surface. Because of the shape of the body, the cup has a natural tendency to become disengaged if any leakage occurs. For this reason, suction cups cannot be reliable secured to roughened surfaces or the like.

When suction cups are used to support a load on a surface which is substantially vertical (where the load force is substantially parallel with the plane of the mounting surface) such as a glass window or the like, the suction cup may remain adhered to the surface but slide in the direction of applied force. Furthermore, since suction cups rely on atmospheric pressure and define a relatively large concavity, adhesives cannot be successfully applied to the interior surface of the cups because such adhesives would permit leakage. A mounting support which does not exhibit these shortcomings is, therefore, highly desirable.

In accordance with the present invention a mounting support is provided with an adhesion surface which is sufficiently soft and pliable to conform to slightly roughened surfaces. The adhesion surface is also slightly concave so that the mounting support may be pressed onto a support surface and the body secured to the support surface by atmospheric pressure. However, the concavity of the inner surface is so slight that the periphery of the body is not enlarged by compression. Accordingly, the body has little tendency to automatically return to its natural state and thereby break the adhesive seal. Since the adhesion surface is soft and pliable, it readily adheres to slightly roughened surfaces and thus resists movement because of friction. The mounting support thus may be applied to roughened surfaces and remain securely affixed thereto. Other features and advantages of the invention will become more readily understood from the following detailed description taken in connection with the appended claims and attached drawing in which:

Figure 1:
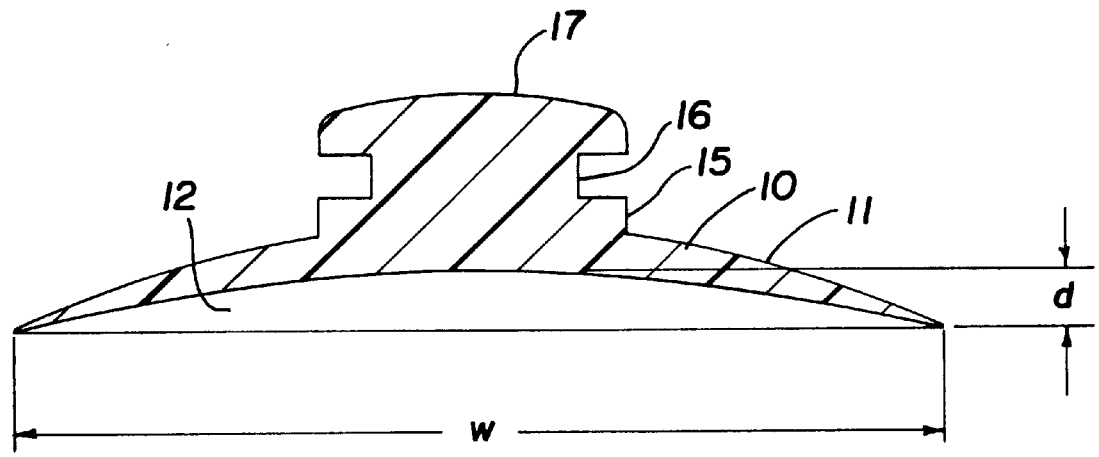
FIG. 1 is a sectional view of a mounting support which embodies the principles of the invention.
Figure 2:
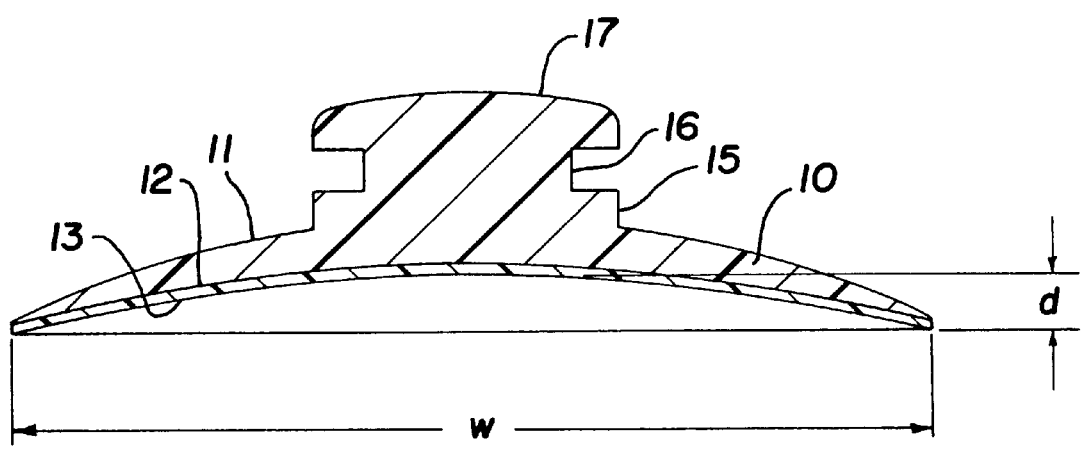
FIG. 2 is a sectional view of a mounting support of the configuration of FIG. 1 including an adhesive on the inner surface thereof.
Figure 7:
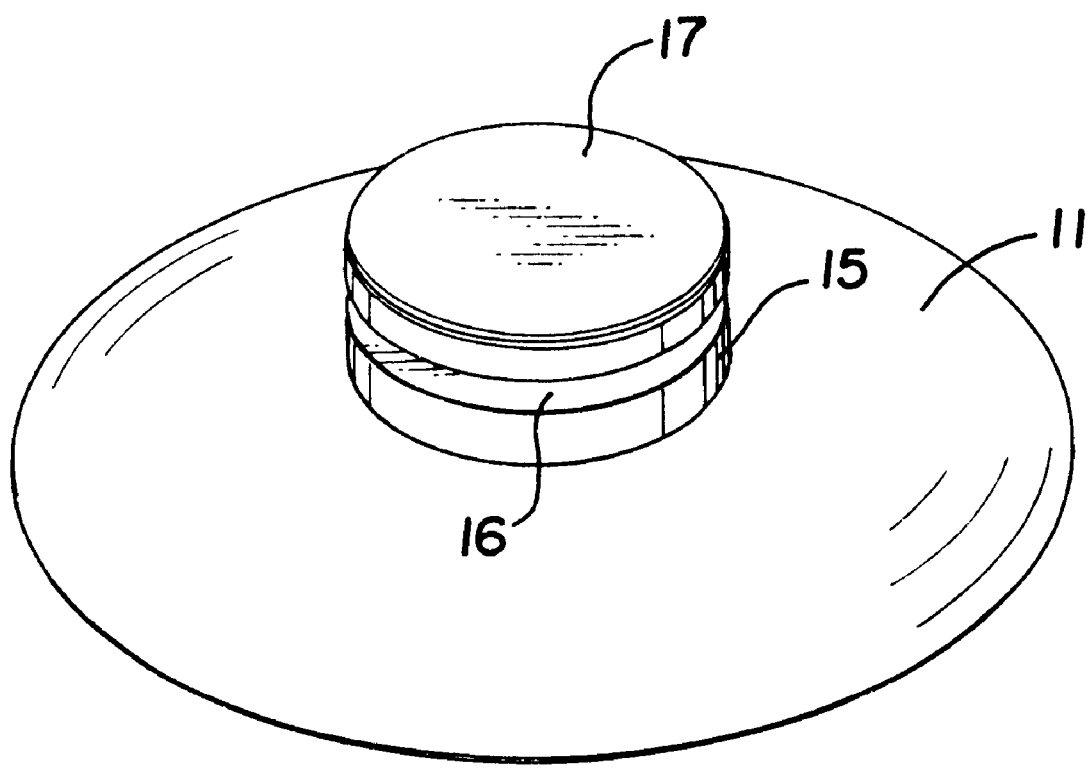
FIG. 7 is a top perspective view of the mounting support of FIGS. 1 and 2.

The mounting support of the present invention forms a platform which uniformly adheres to the mounting surface and has little or no tendency to form leaks at or near its periphery. In the embodiment illustrated the mounting support comprises a body 10 with substantially parallel oppositely disposed major faces 11, 12. In FIGS. 7, 1 and 2 the body 10 is substantially circular or disk-like and has a stem 15 extending from a central portion of the outer surface 11. The stem, however, need not be centrally located on the body 10. A groove 16 circumscribes stem 15 for mounting objects to the mounting support. The crown 17 at the outer end of the stem 15 may be enlarged and/or may be removeably attached to stem 15 for securing the stem to objects to be mounted. Other conventional means for attaching objects to the mounting support may also be used.

To avoid the inherent tendency of a suction cup to resume its natural shape (and in so doing break the seal between the cup surface and the mounting surface) the body of the mounting support of the invention is soft and highly pliable. In the preferred embodiment, the body 10 is formed of soft material such as virgin surgical vinyl or the like. Furthermore, the ratio of the largest width of the attachment surface (shown as diameter w in FIGS. 1 and 2) to the depth of the concavity (shown as d in FIGS. 1 and 2) should be on the order of 20:1. In this configuration the volume of the concavity is quite small and the inner surface 12 may be forced against a mounting surface without substantially enlarging the diameter w of the periphery of the body. When the ratio of largest width to depth is on the order of 20:1, the outer portion of the inner surface 12 adjacent the periphery forms an extended platform with a surface which substantially conforms to the plane of the mounting surface. Since the concavity is extremely shallow, there is little tendency for the body to resume its natural shape and thus little tendency to break the seal between the inner surface 12 and the mounting surface. By using extremely soft materials such surgical vinyl or the like, the inner surface 12 of the body may readily conform to a roughened surface and maintain a seal therewith.

To improve sealing capabilities as well as frictional adherence an adhesive 13 may be applied to inner surface 12 to help secure the inner surface 12 to the mounting surface. Conventional adhesives such as water-soluble or contact adhesives may be used. Since there is little tendency for the body 10 to resume its formed shape, there is substantially no tendency for air to leak through the adhesive 13.

Figure 3:
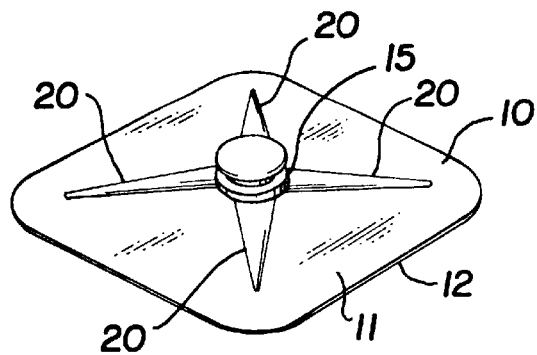
FIG. 3 is a top perspective view of an alternative embodiment of the invention.
Figure 4:
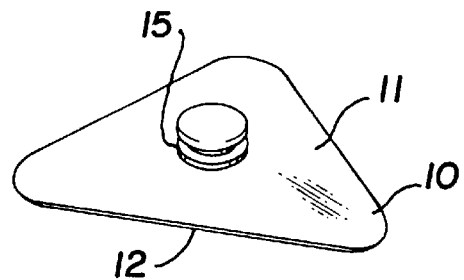
FIG. 4 is a top perspective view of yet another alternative embodiment of the invention.

Since the mounting support of the invention utilizes an extremely shallow concavity and does not require expansion of the periphery or compression of the body, the periphery of the body may take various shapes other than circular. In fact, it may take any desired shape. For example, as shown in FIG. 3 the periphery of the body 10 may be rectangular. As shown in FIG. 4 the periphery of the body 10 may be triangular. Other configurations are also suitable.

As shown in FIG. 3, the body 10 may be a soft pliable web suspended between ribs 20. The inner surface 12 may be concave or may be essentially planar with only the inner surface of the ribs 20 slightly concave so that the body 10 is secured to a mounting surface by atmospheric pressure exerted on the outer surface of the ribs 20 and by frictional and adhesive engagement between the inner surface 12 of body 10 and the mounting surface.

Figure 5:
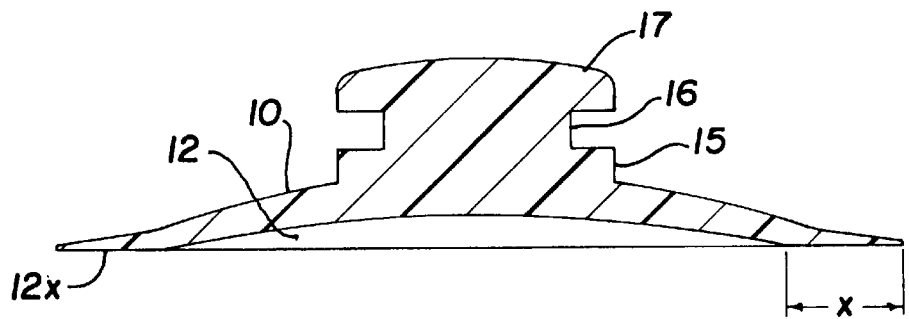
FIG. 5 is a sectional view of an alternate embodiment of the invention.

In the embodiment illustrated in FIG. 5 only the central portion of the inner surface 12 is concave. The radially outer portions 12x of inner surface 12 are essentially planar. Thus, when the body 10 is positioned adjacent a substantially flat surface the planar outer portion 12x lies adjacent the mounting surface and forms a sealing relationship therewith before the central concavity is reduced. The area of the extended sealing platform defined by the outer planar portion 12x is preferably larger than the surface area of the central cavity. This configuration insures that the sealing surface is sufficiently large enough to minimize leakage and that the tendency of the central portion to resume its concavity is also diminished.

In the preferred embodiment the body 10 is formed by injecting molding vinyl such as that sold by Colorite Plastics Company of Ridgefield, N.J., under the trade designation UNICHEM 6512 N-02. The molded product exhibits the following typical physical characteristics:

| Specific gravity | 1.19 g/ml | (ASTM D-792) |
| Tensile strength | 1700 psi | (ASTM D-638) |
| % Elongation | 450 | (ASTM D-638) |
| 100% Modulus | 620 psi | (ASTM D-638) |
| Brittle point | −44° C. | (ASTM D-746) |
| Shore A hardness | 65 | (ASTM D-2240) |

Figure 6:
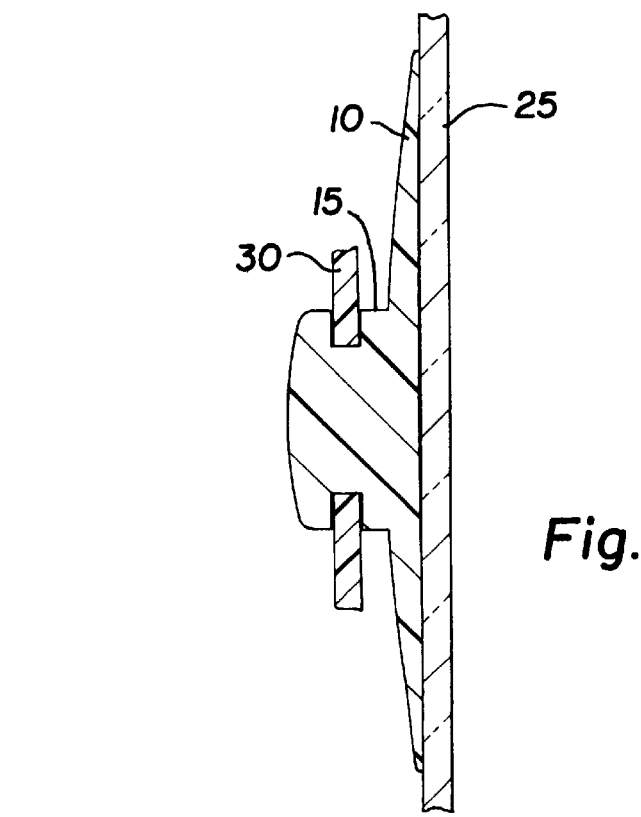
FIG. 6 is a fragmentary sectional view of an assembly of the mounting support of FIG. 5 secured to a mounting surface and supporting an object.

Mounting supports as described above are particularly adapted for supporting displays, shelves and the like on the inside surface of a transparent wall of a refrigerated vault or the like. For example, various displays, shelves, etc., are commonly used in refrigerated vaults of convenience stores to store and display goods in a refrigerated environment. Since the mounting surface is usually glass, the mounting attachment must not damage or disfigure the mounting surface but must remain securely adhered thereto for long periods of time under physical load while subjected to wide variations in temperature, humidity, etc. In the embodiment of FIG. 6 the mounting support body 10 is secured to the inner surface of a glass wall or door 25 of a refrigerated vault or the like. A shelf, rack, display or the like 30 is secured to stem 15 and thus mounted within the interior of the vault.

Although the invention has been described with particular reference to specific mounting support structures and applications, these forms of the invention are to be taken as illustrative of the principles thereof. Accordingly, it is to be understood that the forms of the invention shown and described in detail are to be considered examples only and that various changes, modifications and rearrangements may be resorted to without departing from the spirit and scope of the invention as defined by the appended claims.

What is claimed:

1. A mounting support comprising:
    (a) a body having substantially parallel first and second substantially oppositely disposed major faces, the first face defining a periphery and a slightly concave inner surface within said periphery; and
    (b) a mounting stem extending from said second face wherein:
        (i) the ratio of the largest width of said periphery to the depth of the concavity is on the order of 20:1 when the mounting support is in its natural state, and
        (ii) the area defined by said periphery is not substantially increased when said first face is pressed against a mounting surface sufficiently to eliminate its concavity.

2. A mounting support as defined in claim 1 including an adhesive on said first major face.

3. A mounting support as defined in claim 1 wherein said periphery is rectangular.

4. A mounting support as defined in claim 1 including ribs formed in said second major face.

5. A mounting support as defined in claim 4 wherein the surface of said first face opposite said second face between the ribs is substantially flat.

6. A mounting support as defined in claim 1 wherein a portion of the first face is substantially planar and a portion of the first face is concave when said mounting support is in its natural state and said substantially planar portion remains planar and is aligned with the remainder of the first face when said first face is pressed against a mounting surface sufficiently to eliminate its concavity.

7. A mounting support as defined in claim 6 wherein the surface area of the substantially planar portion of the first face is greater than the surface area of the concave portion.

8. A mounting support as defined in claim 6 wherein the body is substantially disc-shaped and the substantially planar portion of the first face is adjacent said periphery.

9. A mounting support as defined in claim 1 wherein said body is molded vinyl having a specific gravity of about 1.19 g/ml, a tensile strength of about 1700 psi, a brittle point of about −44° C. and a Shore A hardness of about 65.

10. A combination comprising:
    (a) a refrigerated vault having a substantially transparent wall;
    (b) a mounting support secured to said wall comprising a body having substantially parallel first and second substantially oppositely disposed major faces and a mounting stem extending from said second face wherein:
        (i) the first face defines the periphery of said body and a slightly concave surface within said periphery when said body is in its natural state;
        (ii) the ratio of the largest width of said periphery to the depth of the concavity is on the order of 20:1 when the mounting support is in its natural state; and
        (iii) the area defined by said periphery is not substantially increased when said first face is pressed against a mounting surface sufficiently to eliminate its concavity; and
    (c) an object secured to said mounting stem and suspended within said refrigerated vault.

11. A combination as defined in claim 10 including an adhesive on said first major face.

12. A combination as defined in claim 10 wherein said periphery is rectangular.

13. A combination as defined in claim 10 including ribs formed in said second major face.

14. A combination as defined in claim 13 wherein the surface of said first face opposite said second between the ribs is substantially flat.

15. A combination as defined in claim 15 wherein a portion of the first face is substantially planar and a portion of the first face is concave.

16. A combination as defined in claim 15 wherein the surface area of the substantially planar portion of the first face is greater than the surface area of the concave portion.

17. A combination as defined in claim 15 wherein the body is substantially disc-shaped and the substantially planar portion of the first face is adjacent said periphery.

18. A combination as defined in claim 10 wherein said body is molded vinyl having a specific gravity of about 1.19 g/ml, a tensile strength of about 1700 psi, a brittle point of about −44° C. and a Shore A hardness of about 65.

19. A combination comprising:
(a) a refrigerated vault having a substantially transparent wall;
(b) a mount support secured to said wall comprising a body having substantially parallel first and second substantially oppositely disposed major faces and a mounting stem extending from said second face wherein:
  (i) the first face defines the periphery of said body and a slightly concave surface within said periphery when said body is in its natural state;
  (ii) the ratio of the largest width of said periphery to the depth of the concavity is greater than 20:1 when the mounting support is in its natural state; and
  (iii) the area defined by said periphery is not substantially increased when said first face is pressed against a mounting surface sufficiently to eliminate its concavity; and
(c) an object secured to said mounting stem and suspended within said refrigerated vault.

* * * * *

UNITED STATES PATENT AND TRADEMARK OFFICE
CERTIFICATE OF CORRECTION

PATENT NO. : 5,964,437
DATED : Oct. 12, 1998
INVENTOR(S) : Belokin et al.

It is certified that error appears in the above-identified patent and that said Letters Patent is hereby corrected as shown below:

Col. 4, line 63, "second between" should read ---second face between---

Col. 4, line 65, "claim 15 wherein" should read ---Claim 10 wherein---

Signed and Sealed this

Twenty-fifth Day of April, 2000

Attest:

Q. TODD DICKINSON

*Attesting Officer*     *Director of Patents and Trademarks*